Figure 1:
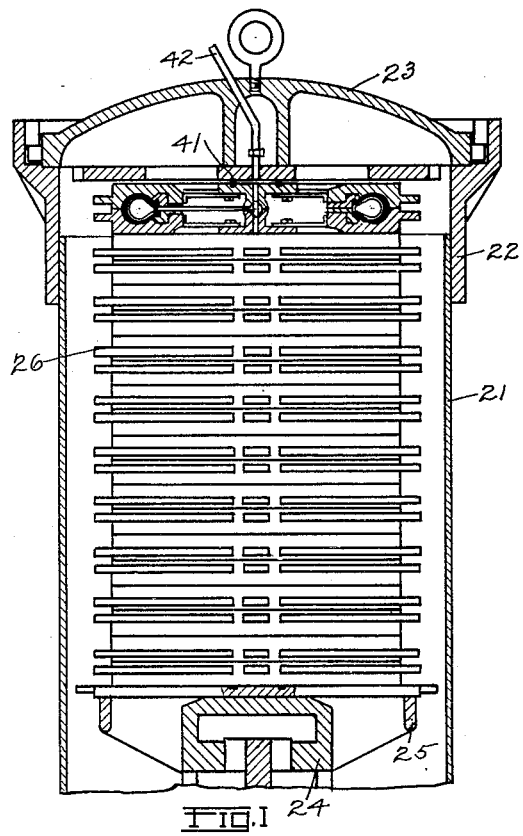

March 1, 1932.  G. J. MEAD  1,847,408

APPARATUS FOR VULCANIZATION

Filed Nov. 10, 1922  6 Sheets-Sheet 1

GEORGE J. MEAD
INVENTOR

BY Hadley Freeman
ATTORNEY

March 1, 1932.  G. J. MEAD  1,847,408
APPARATUS FOR VULCANIZATION
Filed Nov. 10, 1922   6 Sheets-Sheet 2

GEORGE J MEAD
INVENTOR

March 1, 1932. G. J. MEAD 1,847,408
APPARATUS FOR VULCANIZATION
Filed Nov. 10, 1922 6 Sheets-Sheet 3
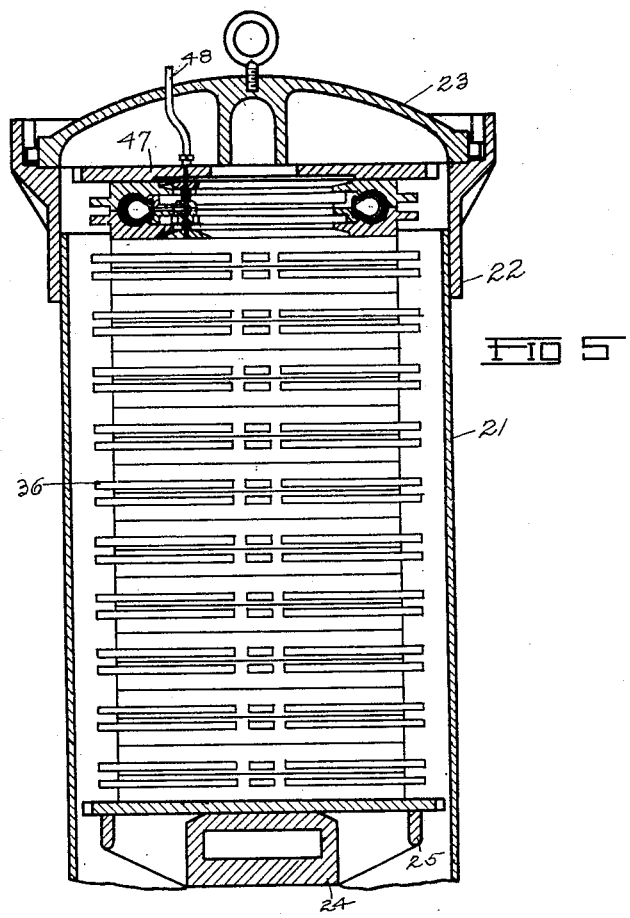
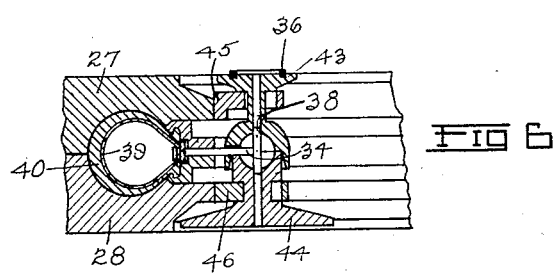
GEORGE J. MEAD
INVENTOR
BY
ATTORNEY March 1, 1932. G. J. MEAD 1,847,408
APPARATUS FOR VULCANIZATION
Filed Nov. 10, 1922 6 Sheets-Sheet 4

GEORGE J. MEAD
INVENTOR
BY
ATTORNEY

March 1, 1932. G. J. MEAD 1,847,408
APPARATUS FOR VULCANIZATION
Filed Nov. 10, 1922    6 Sheets-Sheet 5
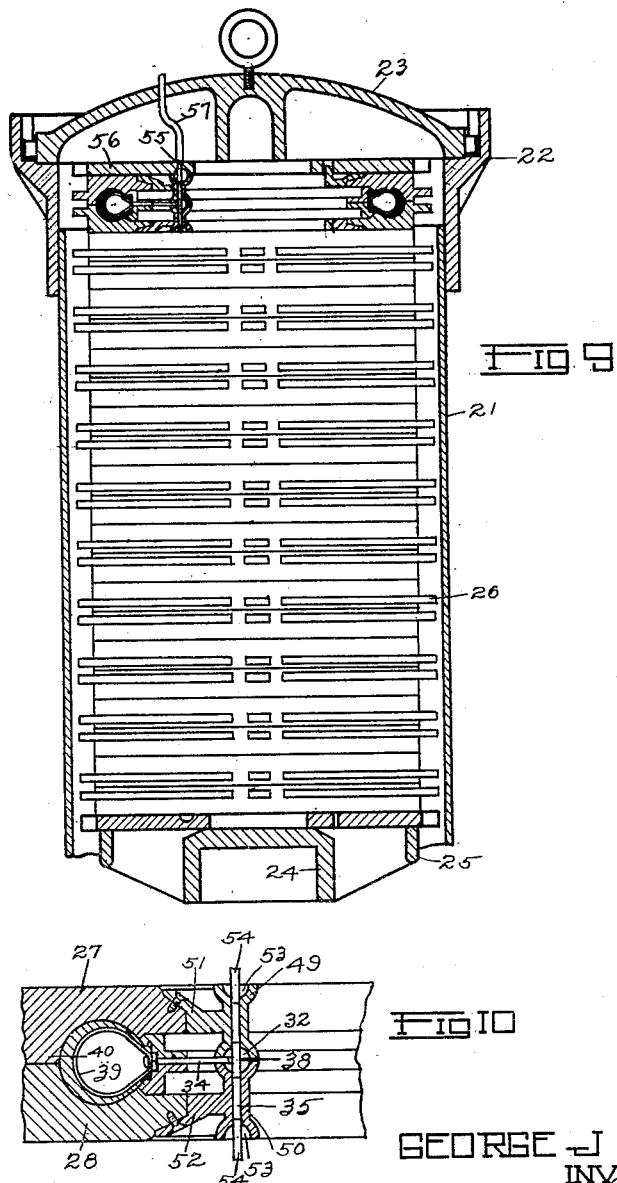
GEORGE J MEAD
INVENTOR
BY
ATTORNEY March 1, 1932. G. J. MEAD 1,847,408
APPARATUS FOR VULCANIZATION
Filed Nov. 10, 1922   6 Sheets-Sheet 6

GEORGE J MEAD
INVENTOR
BY
ATTORNEY

Patented Mar. 1, 1932

1,847,408

UNITED STATES PATENT OFFICE

GEORGE J. MEAD, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

APPARATUS FOR VULCANIZATION

Application filed November 10, 1922. Serial No. 600,190.

Figure 2:
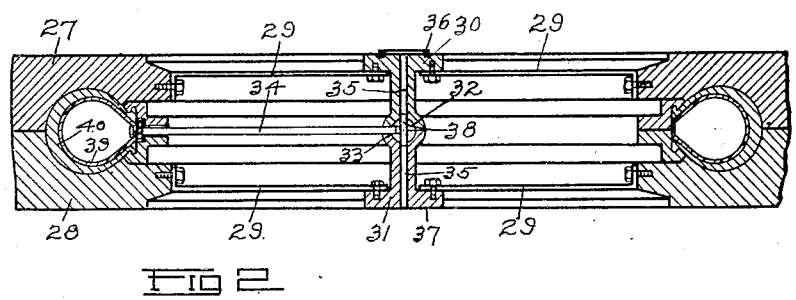
Figure 3:
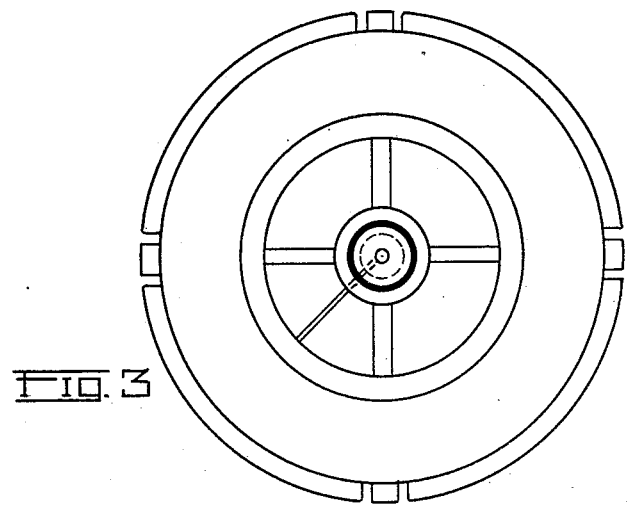
Figure 4:
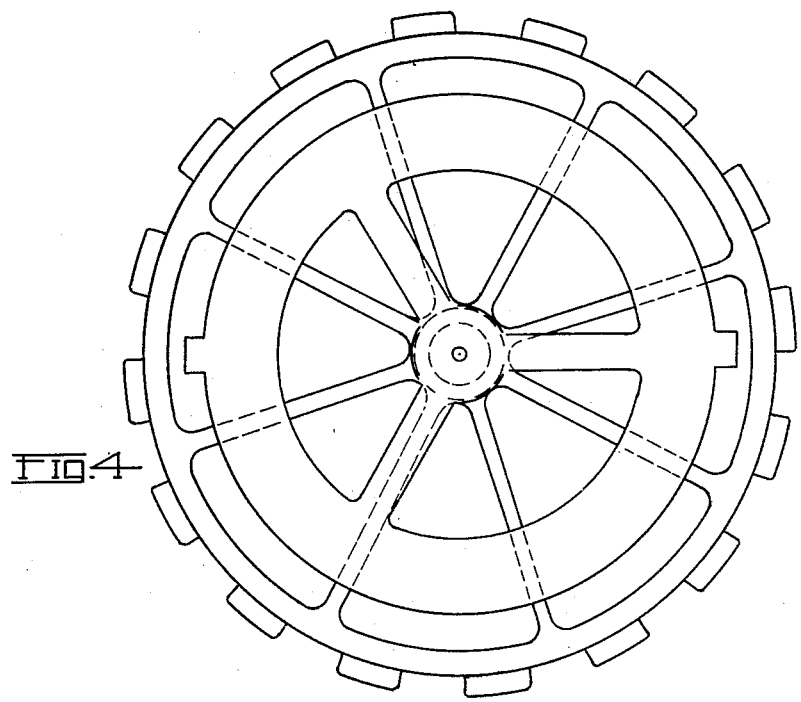
Figure 7:
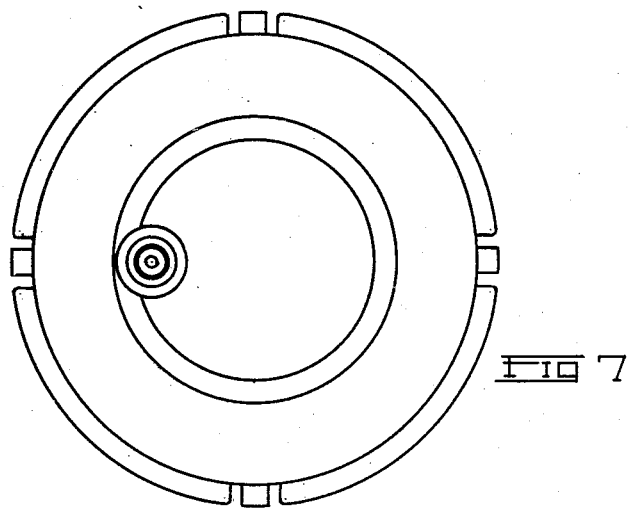
Figure 8:
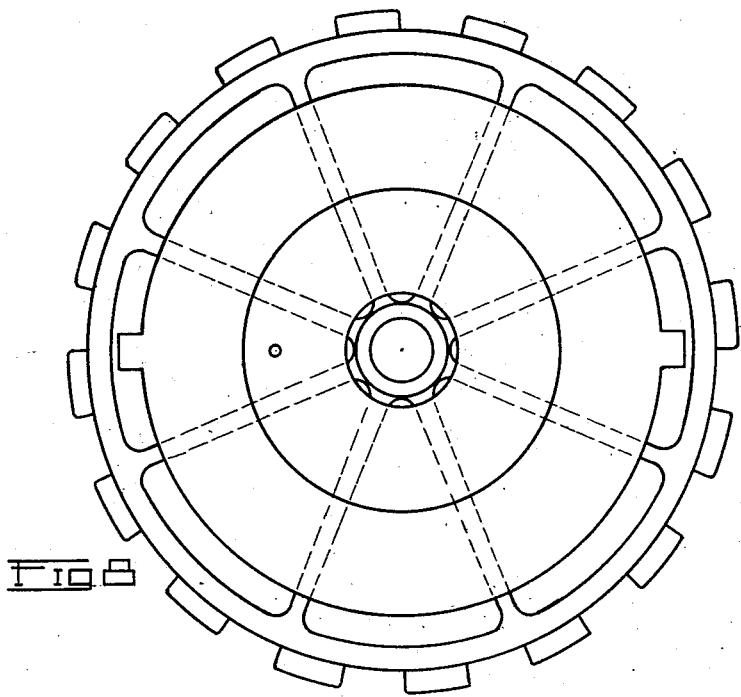
Figure 11:
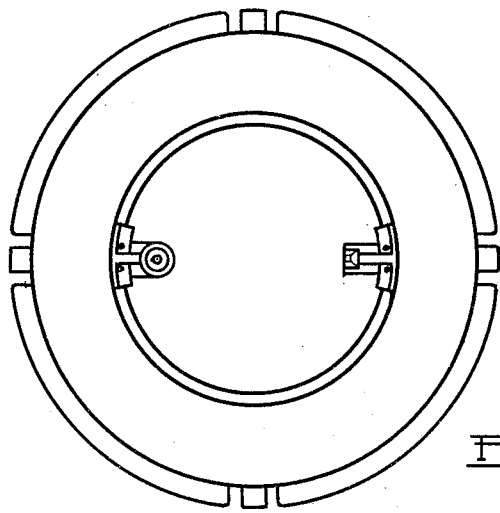
Figure 12:
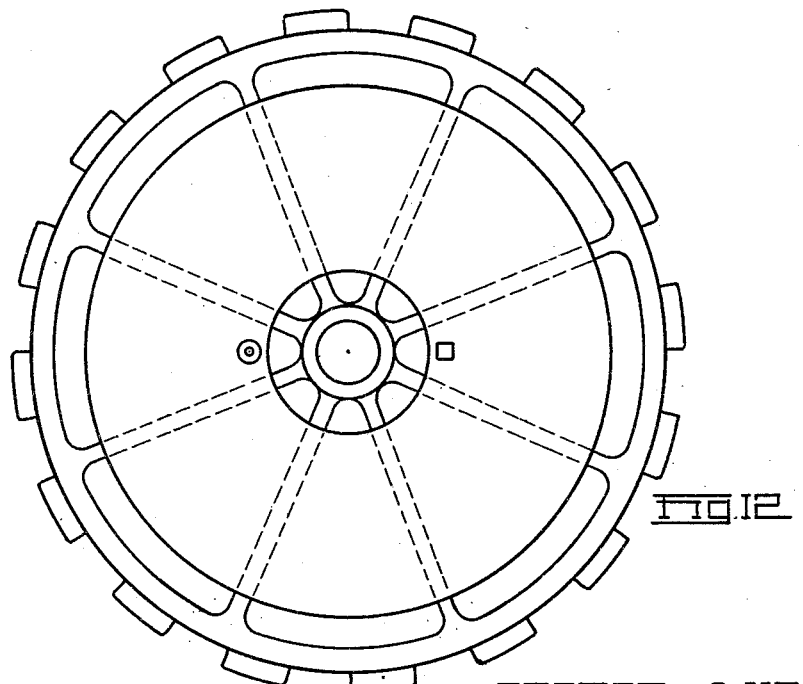

My invention relates to apparatus for vulcanization and the principal object of my invention is to provide new and improved apparatus of this type. In the drawings accompanying this specification and forming a part thereof I have shown, for purposes of illustration, certain forms which my invention may assume. In these drawings:

Figure 1 represents a vertical section of a heater showing one embodiment of my invention, Figure 2 represents an enlarged section through the mold of Figure 1, Figure 3 represents a plan view of the mold of Figure 2, Figure 4 represents a plan view of the heater cap of Figure 1, Figures 5, 6, 7, and 8 represents similar views of a second embodiment of my invention, while Figures 9, 10, 11, and 12 represent similar views of a third embodiment.

In Figure 1 I have shown a fragmentary sectional view of a heater comprising side walls 21, top 22, cover 23, ram 24, and ram table 25 and in this heater I have shown a plurality of mold units 26. Each of these mold units 26 consists of an upper half 27 and a lower half 28 which carry by means of resilient supports 29 fittings 30 and 31 respectively. Each of these fittings 30 and 31 is provided at the inner end with a semi-spherical recess 32 the wall of which is recessed at 33 to receive a duct 34. Each of the fittings 30 and 31 is also provided with a passage 35 leading from the outer end to the semi-spherical recess 32. The fitting 30 is provided on its outer face with a packing 36 adapted to engage the smooth outer face 37 of the fitting 31. The duct 34 is provided at its end with a T 38 adapted to enter the channels 35 and make tight connection therewith and at its other end is connected to an air bag 39.

It will be understood that in operation the air bag including the duct 34 and T 38 is placed in position within the casing 40 and the casing then placed in the lower section of the mold 38 whereupon the lower end of the T 38 enters the channel 35 in the fitting 31. Thereafter the top section of the mold is placed on the tire and the upper end of the T 38 enters the channel 35 in the fitting 30. The molds are then placed in the heater and the ram pressure applied to close them whereupon the packing 36 of each fitting 30 will come into tight contact with the outer face 37 of each fitting 31 except that the packing 36 of the top mold will come into contact with a plate 41 carried by the heater cover 23 and provided with a conduit 42 leading out through the cover.

In the embodiment disclosed in Figures 5, 6, 7, and 8 I have substituted for the fittings 30 and 31 fittings 43 and 44 which are ordinarily connected to the mold sections by means of brackets 45 and 46 but otherwise operate in substantially the same manner. In this case, however, the heater cover 23 is provided with a plate 47 at one side thereof to cooperate with the packing 36 of the top mold and this cover is provided with a conduit 48 similar to the conduit 42.

In the embodiment of Figures 9, 10, 11, and 12 I have shown fittings 49 and 50 secured to the mold sections 27 and 28 by means of brackets 51 and 52 and provided with the same semi-spherical end portions 32 to receive the T end 38 of the duct 34 leading to the air bag 39 within the casing 40. In this modification, however, I have dispensed with the packing between the fittings of adjacent molds and substituted at the outer end of each fitting semi-spherical recesses 53 adapted to receive short connections 54 to connect with the channel 35 of the adjacent mold or with a channel 55 in a plate 56 secured to the heater cover 23 and provided with a conduit 57 leading out through the heater cover 23 to which the plate 56 is secured.

I have described herewith three embodiments which my invention may assume but the description herein is illustrative only and my invention is not limited thereto.

I claim:

Tire vulcanizing apparatus which comprises opposed press members, two separable annular mold sections adapted to engage the tread and side wall portions of the tire, an annular intermediate bead molding section adapted to support the tire and an air bag enclosed therein prior to the enclosure of the tire in said separable mold sections, an air duct extending from the air bag to a point within the mold annulus, brackets carried by said separable mold sections, and opposed air connection members carried by said brackets and positioned to engage the free end of said air duct between them to establish, upon closure of the press members, a fluid-tight connection with said duct through which fluid pressure may be supplied to the interior of the air bag.

In testimony whereof I have signed my name to the above specifications.

GEORGE J. MEAD.